(12) United States Patent
Watabe (10) Patent No.: US 7,227,457 B2
(45) Date of Patent: Jun. 5, 2007

(54) TIRE INFLATION PRESSURE SENSING APPARATUS BASED ON TRANSPONDER METHOD

(75) Inventor: Nobuya Watabe, Nagoya (JP)

(73) Assignee: DENSO Corporation, Kariya (JP)

( * ) Notice: Subject to any disclaimer, the term of this patent is extended or adjusted under 35 U.S.C. 154(b) by 181 days.

(21) Appl. No.: 11/149,446

(22) Filed: Jun. 10, 2005

(65) Prior Publication Data

US 2005/0280523 A1 Dec. 22, 2005

(30) Foreign Application Priority Data

Jun. 10, 2004 (JP) .............................. 2004-172418
Dec. 22, 2004 (JP) .............................. 2004-371538

(51) Int. Cl.
*B60C 23/00* (2006.01)

(52) U.S. Cl. ...................... 340/442; 340/445; 340/447; 340/10.3

(58) Field of Classification Search ................ 340/442, 340/445, 447, 10.3, 10.34
See application file for complete search history.

(56) References Cited

U.S. PATENT DOCUMENTS 5,602,524 A 2/1997 Mock et al.

2003/0102966 A1* 6/2003 Konchin et al. ............ 340/445
2004/0183665 A1* 9/2004 McClelland et al. ........ 340/445
2005/0156723 A1* 7/2005 Fujii .......................... 340/447
2007/0013502 A1* 1/2007 Park et al. .................. 340/447

FOREIGN PATENT DOCUMENTS

| JP | 7-507513 | 8/1995 |
| JP | 2000-255229 | 9/2000 |
| JP | 2003-2019 | 1/2003 |

* cited by examiner

*Primary Examiner*—Jeffery Hopsass
*Assistant Examiner*—Edny Labbees
(74) *Attorney, Agent, or Firm*—Posz Law Group, PLC (57) ABSTRACT

A tire inflation pressure sensing apparatus includes a transmitter on a wheel of a vehicle and a receiver on a body of the vehicle. The transmitter includes a pressure sensor working to generate a pressure signal and a charging unit configured to be charged with electrical power via a radio wave from the receiver. The receiver performs a "packet charge" for the charging unit of the transmitter, during which operation of the receiver is changed alternately between an ON-mode and an OFF-mode. When the receiver receives in the OFF-mode an informing signal from the transmitter, it stops the packet charge to receive the pressure signal sent out from the transmitter following the informing signal. The transmitter starts, when the electrical power charged in the charging unit has increased to a predetermined level, to repeatedly send out the informing signal a plurality of times, and then sends out the pressure signal.

9 Claims, 6 Drawing Sheets

TIRE INFLATION PRESSURE SENSING APPARATUS BASED ON TRANSPONDER METHOD

CROSS-REFERENCE TO RELATED APPLICATION

This application claims priority from Japanese Patent Applications No. 2004-172418, filed on Jun. 10, 2004, and No. 2004-371538, filed on Dec. 22, 2004, the contents of which are hereby incorporated by reference into this application.

BACKGROUND OF THE INVENTION

1. Technical Field of the Invention

The present invention relates generally to tire inflation pressure sensing apparatuses or sensors. More particularly, the invention relates to a direct-type tire inflation pressure sensing apparatus in which a transmitter is supplied with electrical power by a transponder method.

2. Description of the Related Art

Conventional direct-type tire inflation pressure sensing apparatuses generally include a transmitter and a receiver. (For example, Japanese Patent No. 3212311, an English equivalent of which is U.S. Pat. No. 5,602,524, discloses such an apparatus.)

The transmitter is directly installed to a wheel of a vehicle and includes a pressure sensor working to sense an inflation pressure of a tire mounted on the wheel. The transmitter is configured to send out a pressure signal representative of the inflation pressure of the tire sensed by the pressure sensor.

The receiver is installed to the body of the vehicle and includes an antenna. The receiver is configured to receive the pressure signal from the transmitter through the antenna and determine the inflation pressure of the tire based on the received pressure signal.

In the above arrangement, the transmitter is generally supplied with electrical power by a battery provided on the wheel of the vehicle. On the other hand, investigations have recently been made to supply electrical power to the transmitter by a transponder method.

According to the transponder method, the receiver works to send out through the antenna thereof a radio wave for electrical power charge toward the transmitter, thereby charging a charging unit of the transmitter with electrical power. When the charging unit of the transmitter is completely charged with electrical power, the transmitter is then activated by the charged electrical power and works to send out the pressure signal toward the receiver.

Such a transponder method is generally used in the field of wireless ID cards. The application of the method to direct-type tire inflation pressure sensing apparatuses provides an advantage of supplying electrical power to the transmitter without any battery provided on the wheel.

In a direct type tire inflation pressure sensing apparatus based on the transponder method, the receiver generally has high sensitivity, and thus can accurately recognize a signal received thereby even when the signal has low level. Accordingly, the receiver can receive and accurately recognize the pressure signal sent out from the transmitter regardless of the angular potion of the transmitter that rotates together with the wheel.

On the other hand, the radio wave for electrical power charge received by the transmitter is required to have a high level so as to be able to charge the charging unit of the transmitter with electrical power.

However, when the transmitter rotates together with the wheel, it is impossible for the transmitter to receive the radio wave for electrical power charge with high level at any angular position thereof.

Especially, when the maximum level of the radio wave sent out from the receiver is restricted under regulations, a possible range of angular position of the transmitter for charge, within which the level of the radio wave for electrical power charge received by the transmitter is above a necessary level for charging the charging unit with electrical power, is very small when the transmitter rotates together with the wheel.

Figure 6A:
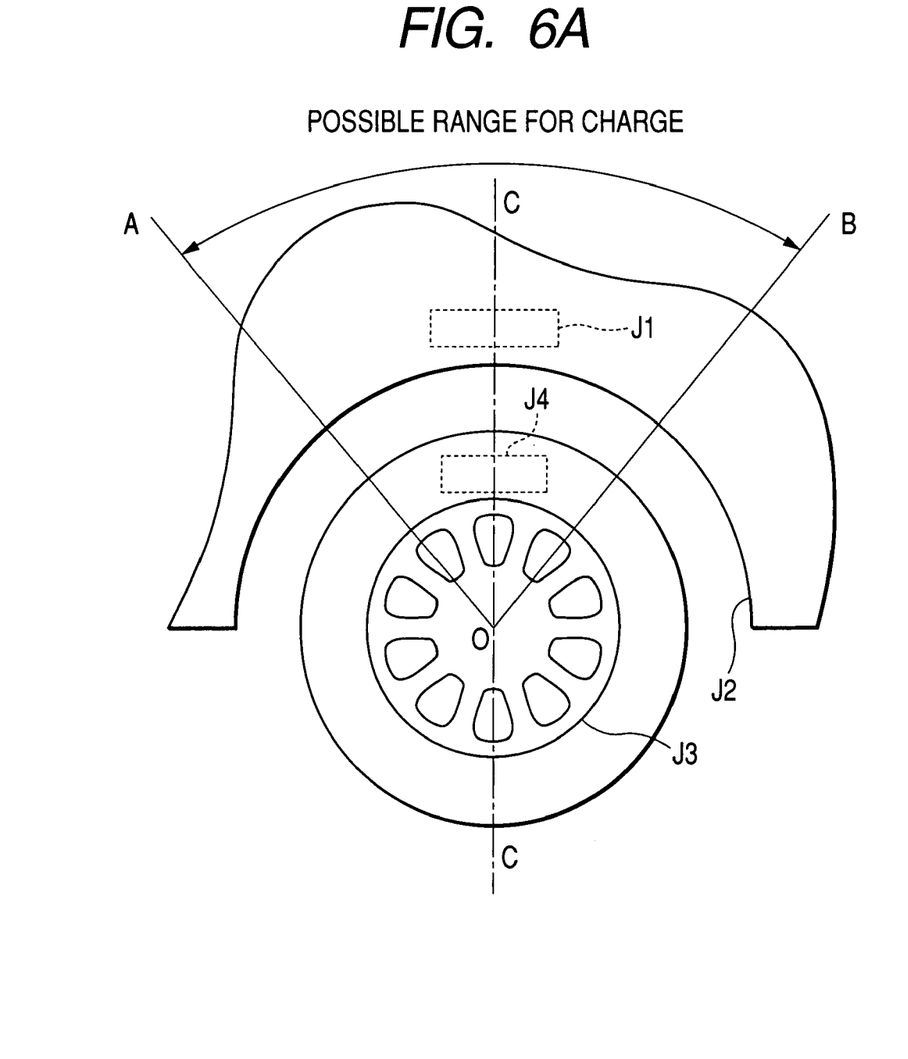
FIGS. 6A–6B are schematic views illustrating a possible range of angular position of a transmitter for charge.
Figure 6B:
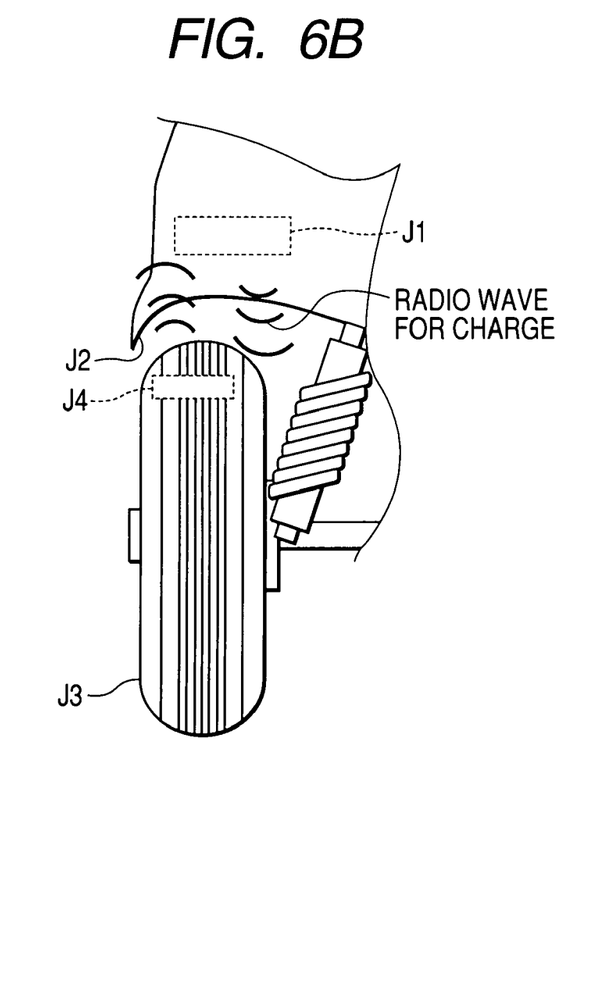

FIGS. 6A–6B illustrates the position of the transmitter relative to the antenna of the receiver. In the figures, the antenna J1 of the receiver is installed to a fender J2 of the vehicle body such that a vertical centerline C—C of the wheel J3 passes through the antenna J1.

In this case, according to the results of an experimental investigation, the possible range of angular position of the transmitter for charge (to be referred to as possible range for charge hereinafter) may be defined as the angular range A-O-B of about 90°, which spreads out from the shaft of the wheel J3 and is symmetrical with respect to the vertical centerline C—C.

In other words, when the transmitter J4 is within the above angular range A-O-B, the transmitter J4 receives the radio wave for electrical power charge from the antenna J1 with high level, so that the charging unit of the transmitter J4 can be charged with electrical power.

Moreover, when the radio wave for electrical power charge sent out from the receiver and the pressure signal sent out from the transmitter J4 have frequencies within the same frequency band, it is very difficult for the receiver to send out the radio wave while receiving the pressure signal and demodulating the received pressure signal. In other words, even if the receiver can receive the pressure signal from the transmitter J4 while sending out the radio wave, the level of the pressure signal received by the receiver is so low that the receiver cannot demodulate the received pressure signal.

Thus, it is necessary for the transmitter J4 to be triggered to send out the pressure signal when the receiver stops sending out the radio wave for electrical power charge, so that transmissions of the radio wave for electrical power charge and the pressure signal can be prevented from being made simultaneously.

However, it is very difficult for the receiver to determine whether the transmitter J4 rotates in the possible range for charge. Also, it is very difficult for the transmitter J4 to determine when the receiver stops sending out the radio wave for electrical power charge.

Accordingly, reliable transmissions of the radio wave for electrical power charge and the pressure signal between the receiver and the transmitter J4 are very difficult to be realized.

Further, when the vehicle is running, the position of the antenna J1 of the receiver relative to the shaft of the wheel J3 varies depending on the road condition and vibrations. Furthermore, different antennas J1 may have different performance characteristics depending on the manufacturing conditions.

Accordingly, it is very difficult to preset a necessary charging time for completely charging the charging unit of the transmitter with electrical power.

SUMMARY OF THE INVENTION

The present invention has been made in view of the above-mentioned problems.

It is, therefore, a first object of the invention to provide a direct-type tire inflation pressure sensing apparatus which is based on the transponder method and has a configuration ensuring reliable transmissions of a radio wave for electrical power charge and a pressure signal between a transmitter and a receiver thereof.

It is a second object of the invention to reliably charge a charging unit of the transmitter of the tire inflation pressure sensing apparatus with electrical power without presetting a necessary charging time for the electrical power charge.

According to a first aspect of the present invention, a tire inflation pressure sensing apparatus includes a pressure sensor, a transmitter, a receiver, and a charging unit.

The pressure sensor is provided on a wheel of a vehicle. The pressure sensor works to sense an inflation pressure of a tire mounted on the wheel and generate a pressure signal representative of the sensed inflation pressure of the tire.

The transmitter is provided on the wheel of the vehicle. The transmitter includes a first antenna and is configured to consecutively send out through the first antenna an informing signal and the pressure signal generated by the pressure sensor. The informing signal is used to inform that the pressure signal is to be sent out from the transmitter following the informing signal.

The receiver is provided on a body of the vehicle. The receiver includes a second antenna and is configured to send out through the second antenna a radio wave for electrical power charge toward the transmitter, receive through the second antenna the informing signal and pressure signal from the transmitter, and determine the inflation pressure of the tire based on the received pressure signal. The receiver selectively operates in an ON-mode, in which the receiver sends out the radio wave without simultaneously receiving the informing signal and pressure signal from the transmitter, and an OFF-mode in which the receiver stops sending out the radio wave and is allowed to receive the informing signal and pressure signal from the pressure sensor.

The charging unit is provided on the wheel of the vehicle. The charging unit is configured to be charged with an electrical power, which is induced by the radio wave received by the transmitter through the first antenna, and supply the electrical power to the pressure sensor and the transmitter.

In the above tire inflation pressure sensing apparatus, the receiver changes an operation thereof alternately between the ON-mode and OFF-mode so as to keep the operation in the ON-mode for a first predetermined time period T1 and in the OFF-mode for a second predetermined time period T2 until it receives the informing signal from the transmitter in the OFF-mode; then the receiver keeps the operation thereof in the OFF-mode until it completes receiving the informing signal and pressure signal from the transmitter.

Further, in the above tire inflation pressure sensing apparatus, the transmitter starts, when a level of the electrical power charged in the charging unit has increased to a predetermined level, to repeatedly send out the informing signal a plurality of times for a third predetermined time period T3 that is no shorter than (T1+T2); then the transmitter sends out the pressure signal.

With the above configuration, transmission of the radio wave for electrical power charge from the receiver to the transmitter and that of the pressure signal from the transmitter to the receiver are prevented from being made simultaneously. As a result, the receiver can reliably receive and demodulate the pressure signal from the transmitter.

Moreover, with the above configuration, the charging unit can be reliably charged with electrical power, without determining the angular position of the transmitter relative to the receiver and presetting a necessary charging time for the electrical power charge.

According to a second aspect of the present invention, in the above tire inflation pressure sensing apparatus, the second predetermined time period T2 is so determined that it is no shorter than a time required for the receiver to receive the informing signal from the transmitter once.

According to a third aspect of the present invention, in the above tire inflation pressure sensing apparatus, the informing signal is composed of a preset code, and when the receiver receives a signal in the OFF-mode, the receiver recognizes the signal as the informing signal when the signal contains the preset code.

Further, in the above case, the second predetermined time period T2 is so determined that it is no shorter than a time period T2min that is determined by the following equation:

$$T2min = (N+1)/A,$$

where, N is a bit number of the preset code, and A is a bit rate for transmitting the preset code from the transmitter to the receiver.

According to a fourth aspect of the present invention, in the above tire inflation pressure sensing apparatus, a voltage across the charging unit represents the level of the electrical power charged in the charging unit, and a necessary voltage across the charging unit, which is required for the transmitter to complete sending out the informing signal and pressure signal, represents the predetermined level of the electrical power.

According to a fifth aspect of the present invention, in the above tire inflation pressure sensing apparatus, when the receiver has not received the informing signal from the transmitter over a predetermined time period Tmax, the receiver stops changing the operation thereof alternately between the ON-mode and OFF-mode.

According to a sixth aspect of the present invention, in the above tire inflation pressure sensing apparatus, the first and second predetermined time periods T1 and T2 are so determined that (T1+T2) is shorter than a time period Tmin required for the wheel to complete one revolution.

According to a seventh aspect of the present invention, in the above tire inflation pressure sensing apparatus, the first predetermined time period T1 is determined based on a first increase rate Tupr1 of charging time for the charging unit, which is represented by (T1+T2)/T1, and a second increase rate Tupr2 of charging time for the charging unit which is represented by Q2/Q1, where Q2 is an electrical charge required for sending out the informing signal the plurality of times and the pressure signal once, and Q1 is an electrical charge required for sending out only the pressure signal once.

Specifically, the first predetermined time period T1 is determined in the following way:

defining a two-dimensional coordinate plane, where a horizontal coordinate axis indicates the first predetermined time period T1, while a vertical coordinate axis indicates an increase rate of charging time for the charging unit;

drawing a first curve on the plane which represents a relationship between the first increase rate Tupr1 and the first predetermined time period T1;

drawing a second curve on the plane which represents a relationship between the second increase rate Tupr2 and the first predetermined time period T1; and determining a horizontal coordinate value of an intersection between the first and second curves as the first predetermined time period T1.

BRIEF DESCRIPTION OF THE DRAWINGS

The present invention will be understood more fully from the detailed description given hereinafter and from the accompanying drawings of the preferred embodiment of the invention, which, however, should not be taken to limit the invention to the specific embodiment but are for the purpose of explanation and understanding only.

In the accompanying drawings.

DESCRIPTION OF THE PREFERRED EMBODIMENT

The preferred embodiment of the present invention will be described hereinafter with reference to FIGS. 1–5.

It should be noted that, for the sake of clarity and understanding, identical components having identical functions have been marked, where possible, with the same reference numerals in each of the figures.

Figure 1:
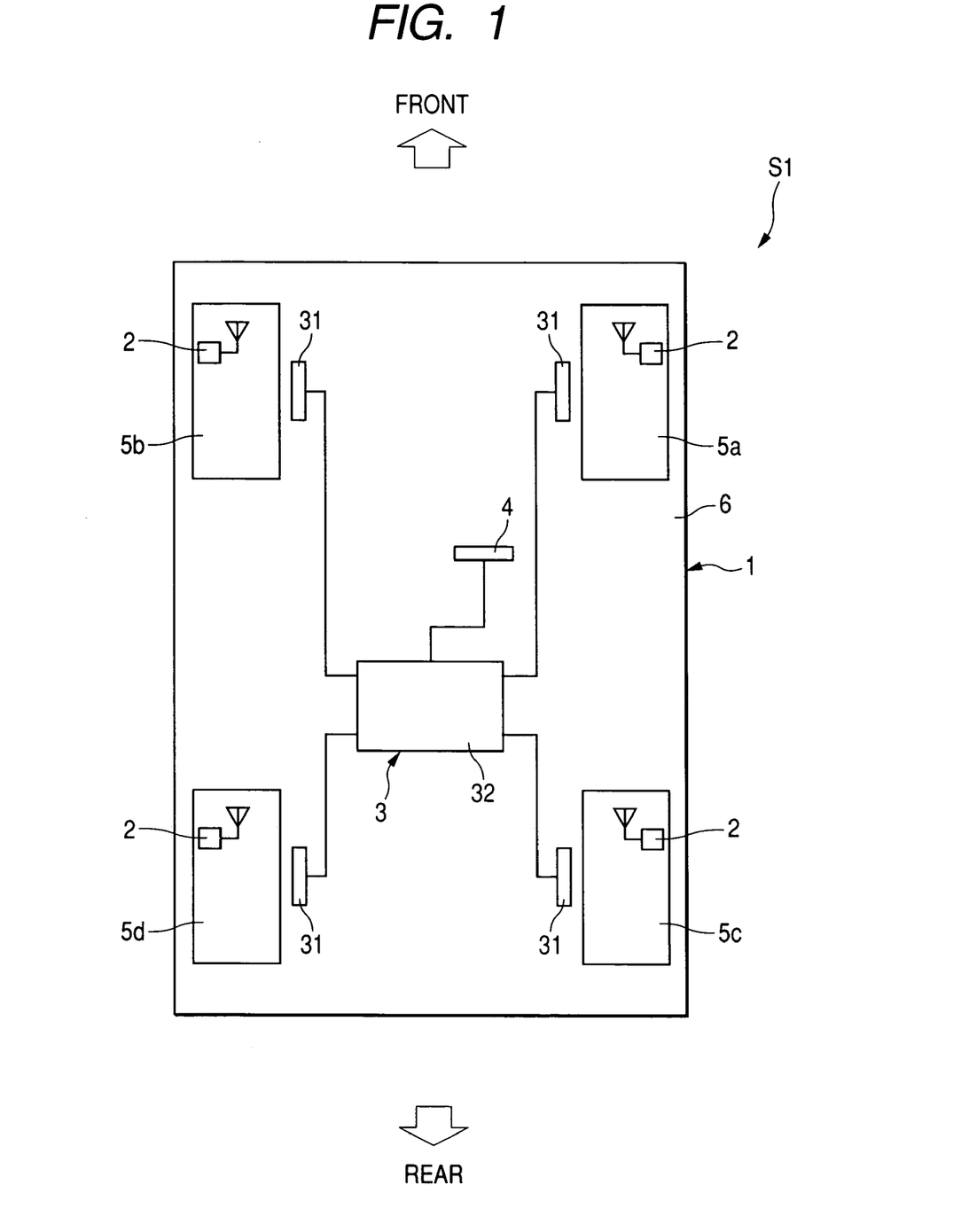
FIG. 1 is a schematic view illustrating the overall configuration of a tire inflation pressure sensing apparatus according to an embodiment of the invention.

FIG. 1 shows the overall configuration of a direct-type tire inflation pressure sensing apparatus S1 according to an embodiment of the invention.

The tire inflation pressure sensing apparatus S1 is installed to a vehicle 1; it is configured to sense inflation pressures of four tires each of which is mounted on one of four wheels 5a–5d of the vehicle 1 (i.e., the front-right wheel 5a, the front-left wheel 5b, the rear-right wheel 5c, and the rear-left wheel 5d).

As shown in FIG. 1, the tire inflation pressure sensing apparatus S1 includes four transmitters 2, each of which is installed to one of the four wheels 5a–5d, a receiver 3 installed to the body 6 of the vehicle 1, and a warning device 4 electrically connected to the receiver 3.

The tire inflation pressure sensing apparatus S1 is based on a transponder method.

Specifically, each transmitter 2 is configured to be charged with electrical power via a radio wave for electrical power charge sent from the receiver 3. After being completely charged, each transmitter 2 is then activated by the charged electrical power and works to sense an inflation pressure of a corresponding one of the four tires and send out a frame that contains a signal representative of the sensed inflation pressure of the tire.

On the other hand, the receiver 3 is configured to send out the radio wave for electrical power charge, receive the frames sent out from the transmitters 2, and determine the inflation pressures of the four tires based on the signals contained in the respective frames.

Figure 2A:
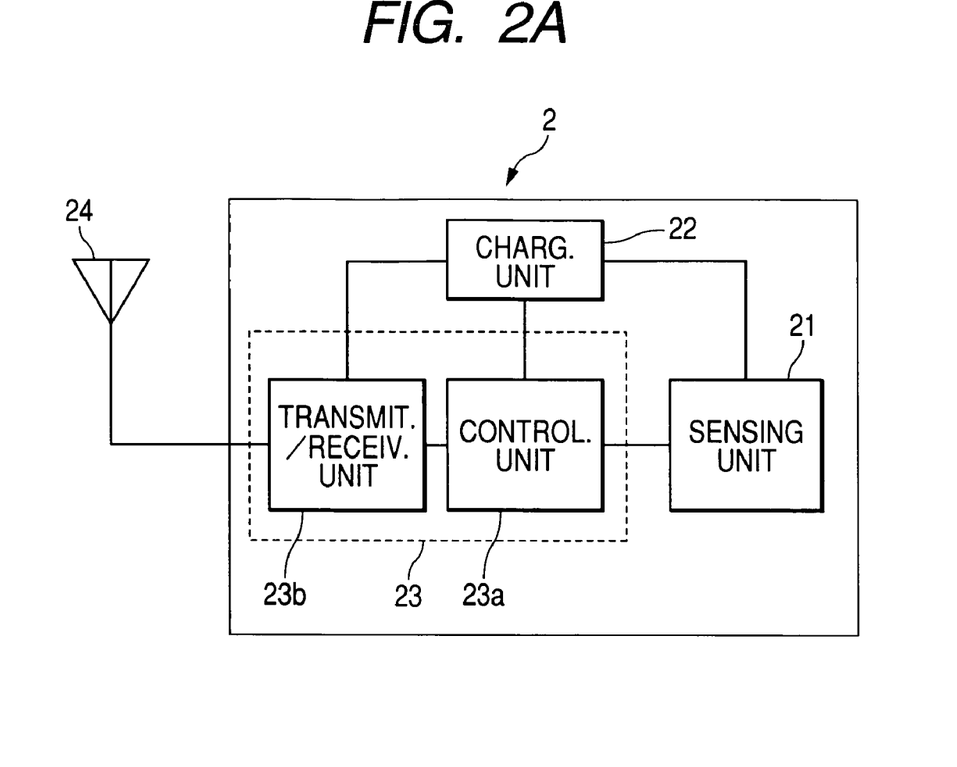
FIG. 2A is a block diagram showing the overall configuration of a transmitter of the tire inflation pressure sensing apparatus of FIG. 1.
Figure 2B:
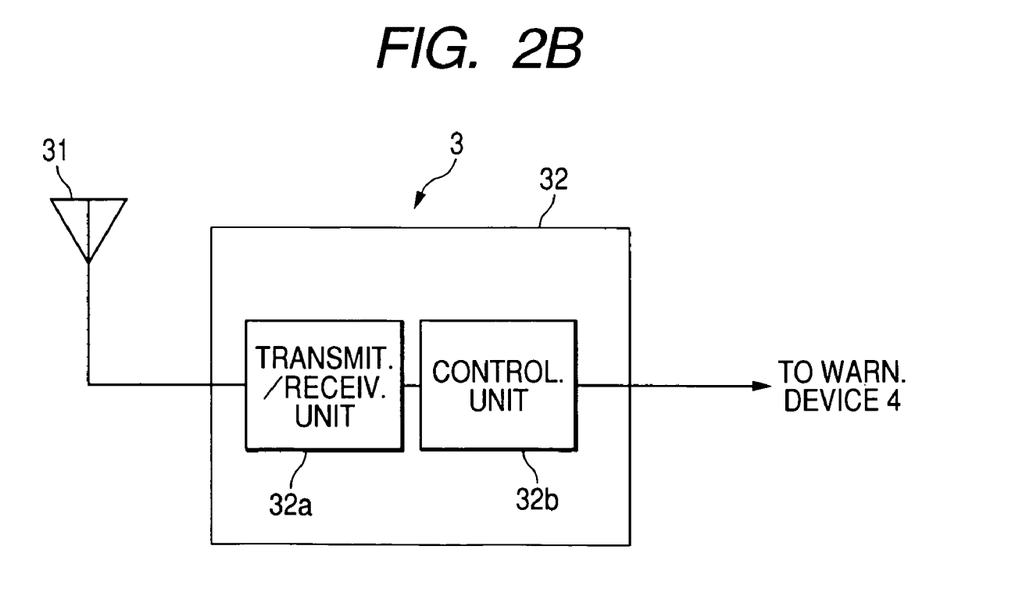
FIG. 2B is a block diagram showing the overall configuration of a receiver of the tire inflation pressure sensing apparatus of FIG. 1.

FIG. 2A shows the overall configuration of each of the transmitters 2, while FIG. 2B shows that of the receiver 3.

Referring first to FIG. 2A, each transmitter 2 includes a sensing unit 21, a charging unit 22, a microcomputer 23, and an antenna 24.

The sensing unit 21 is configured with sensors, such as a diaphragm-type pressure sensor and a temperature sensor, and works to output signals representative of the sensed inflation pressure of the tire and the temperature of air in the tire.

The charging unit 22 is configured to be charged with electrical power, which is induced by the radio wave for electrical power charge received through the antenna 24, and works to supply electrical power to the sensing unit 21 and the microcomputer 23.

The use of electrical power charging systems based on a transponder method is well known in the art, particularly in the field of wireless ID cards; therefore, more details thereabout are omitted hereinafter.

The microcomputer 23 is of a well-known type; it is configured with a CPU (Central Processing Unit), a ROM (READ Only Memory), a RAM (Random Access Memory), and I/O (Input/Output) devices.

The microcomputer 23 functionally includes a controlling unit 23a and a transmitting/receiving unit 23b, which are realized by a program installed in the ROM when the program is activated. The two units 23a and 23b are configured to implement predetermined processes in accordance with the program.

Specifically, the controlling unit 23a receives signals outputted from the sensing unit 21 and processes those signals. Then, the controlling unit 23a stores in a frame those signals together with a plurality of identical informing signals to be described below and provides the frame to the transmitting/receiving unit 23b.

The transmitting/receiving unit 23b receives the radio wave for electrical power charge through the antenna 24 and provides the received radio wave for electrical power charge to the charging unit 22 and the controlling unit 23a. The transmitting/receiving unit 23b also receives the frame provided by the controlling unit 23a and sends out the frame toward the receiver 3 through the antenna 24.

The above-described transmitters 2 each are fixed to an air valve of a corresponding wheel of the vehicle 1 and at least the sensing unit 21 thereof is placed inside the tire on the wheel so as to be exposed to the air in the tire.

Referring now to FIG. 1 and FIG. 2B, the receiver 3 includes four antennas 31 and a microcomputer 32.

Each antenna 31 is provided at a position on the body 6 of the vehicle 1 corresponding to one of the four transmitters 2. For example, each antenna 31 is positioned away from the corresponding transmitter 2 by a given distance and fixed to the body 6 of the vehicle 1.

The microcomputer 32 is of a well-known type; it is configured with a CPU, a ROM, a RAM, and I/O devices.

The microcomputer 32 functionally includes a transmitting/receiving unit 32a and a controlling unit 32b, which are realized by a program installed in the ROM of the microcomputer 32 when the program is activated. The two units 32a and 32b are configured to implement predetermined processes in accordance with the program.

Specifically, the transmitting/receiving unit 32a receives the radio wave for electrical power charge provided by the controlling unit 32b and sends out the received radio wave for electrical power charge toward the transmitters 2 through the respective antennas 31. The transmitting/receiving unit 32a also receives frames sent out from the transmitters 2 through the respective antennas 31 and provides the received frames to the controlling unit 32b.

The controlling unit 32b provides the radio wave for electrical power charge to the transmitting/receiving unit 32a, receives the frames provided by the transmitting/receiving unit 32a, and determines each of the inflation pressures of the four tires through performing signal processing and calculations based on the signals contained in the corresponding one of the received frames.

Further, the controlling unit 32b compares each of the determined inflation pressures of the four tires with a predefined threshold of inflation pressure and outputs a warning signal to the warning device 4 when it is lower than the predefined threshold.

The warning device 4 is arranged, as shown in FIG. 1, in a place that is visible for the driver of the vehicle 1. The warning device 4 may be configured with at least one of a warning lamp, a warning display, and a warning buzzer; both the warning lamp and warning display may be disposed in the instrument panel of the vehicle 1. The warning device 4 informs the driver of any decrease in the inflation pressure of a tire upon receiving a warning signal outputted from the controlling unit 32b.

Having described the overall configuration of the tire inflation pressure sensing apparatus S1, operation thereof will be described hereinafter with reference to FIGS. 3–5.

Figure 3:
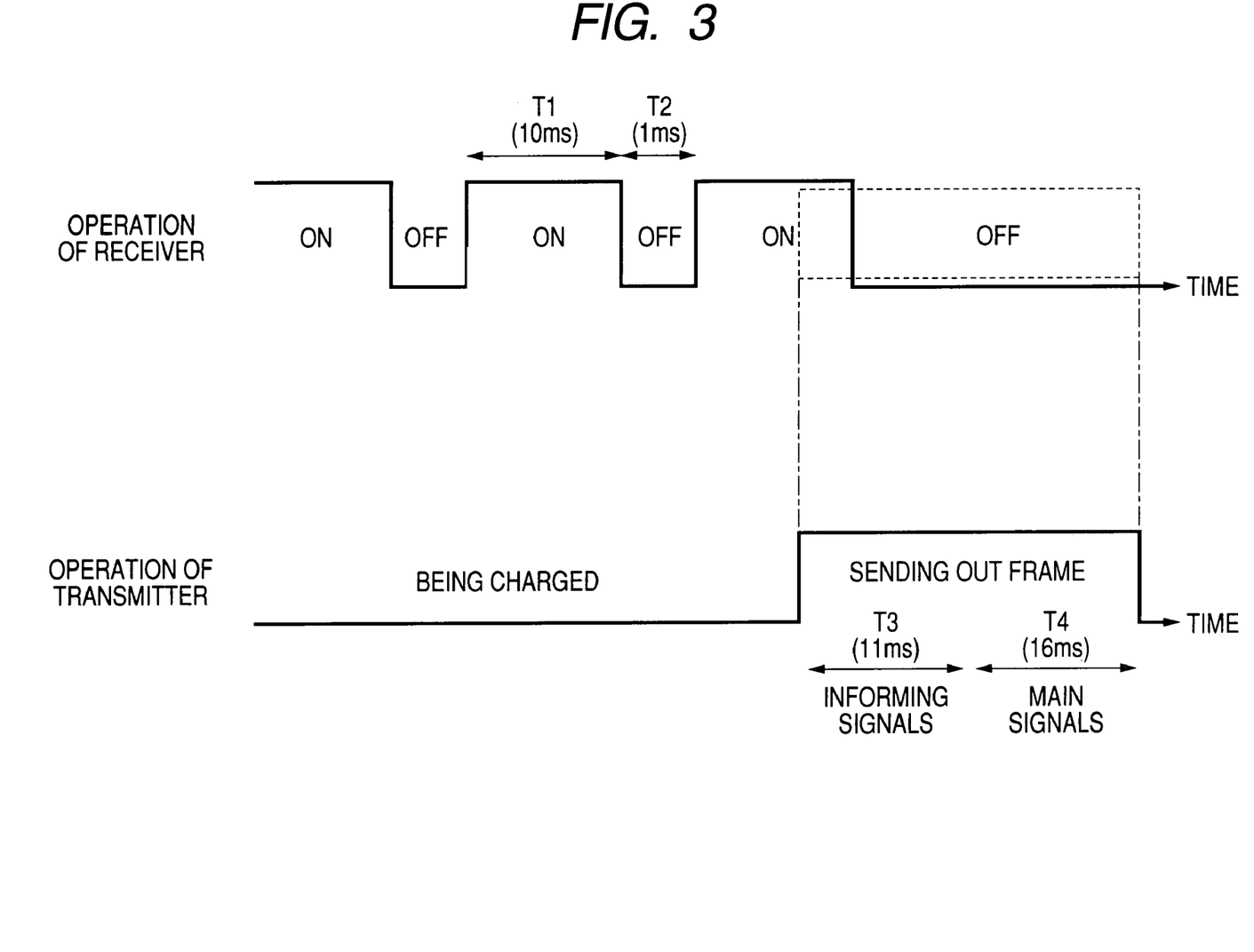
FIG. 3 is a schematic view illustrating operations of the transmitter and receiver of the tire inflation pressure sensing apparatus of FIG. 1.

FIG. 3 illustrates operations of the receiver 3 and transmitters 2, which are controlled by the controlling unit 32b of the receiver 3 and the controlling units 23a of the transmitters 2 respectively.

As shown in FIG. 3, in the present embodiment, the receiver 3 has two operation modes. One mode is an ON-mode in which the receiver 3 sends out the radio wave for electrical power charge without simultaneously receiving the frames sent out from the transmitters 2. The other mode is an OFF-mode in which the receiver 3 stops sending out the radio wave for electrical power charge and is allowed to receive the frames sent out from the transmitters 2 through the respective antennas 31.

The controlling unit 32b changes the operation of the receiver 3 alternately between the ON-mode and OFF mode so as to keep the operation in the ON-mode for a first predetermined time period T1 (e.g., 10 ms) and in the OFF-mode for a second predetermined time period T2 (e.g., 1 ms), until the receiver 3 receives the frame sent out from one of the transmitters 2.

As a result, a "packet charge" is performed for each of the charging units 22 of the transmitters 2. The packet charge here denotes that the receiver 3 sends out the radio wave for electrical power charge a plurality of times at predetermined time intervals.

Upon receiving the radio wave for electrical power charge, each of the charging units 22 of the transmitters 2 is charged with electrical power. After a certain time period, when a level of the electrical power charged in the charging unit 22 of one of the transmitters 2 has increased to a predetermined level, the transmitter 2 starts to send out the frame toward a corresponding one of the antennas 31 of the receiver 3.

The charging unit 22 of the transmitter 2 is configured, for example, with a capacitor. In this case, the electrical charge Q charged in the charging unit 22 and the voltage V across the charging unit 22 satisfy the following relationship:

$$Q = C \times V,$$

where C is the capacitance of the charging unit.

Accordingly, in the above case, the level of the electrical power charged in the charging unit 22 of the transmitter 2 may be represented by the voltage V across the charging unit 22, and the predetermined level of the electrical power may be represented by a necessary voltage Vn across the charging unit 22 which is required for the transmitter 2 to complete sending out the frame.

As described previously, the frame sent out from the transmitter 2 contains the signals outputted from the sensing unit 21 of the transmitter 2 (to be referred to as main signals hereinafter) and a plurality of identical informing signals.

The informing signal is a signal which is informative of that the main signals are to be sent out from the transmitter 2 following that signal. The informing signal is composed of a simple preset code, for example a binary code "0101".

The transmitter 2 consecutively sends out the plurality of identical informing signals for a third predetermined time period T3 (e.g., 11 ms) and the main signals for a fourth predetermined time period T4 (e.g., 16 ms). In other words, the transmitter 2 sends out the frame for a time period of (T3+T4).

On the other hand, when the receiver 3 receives a signal in the OFF-mode thereof, the controlling unit 32b identifies whether the signal is the informing signal or just a noise. Then, based on the identification results, the controlling unit 32b determines whether to continue performing the packet charge or to stop the packet charge and receive the frame from the transmitter 2.

For example, when the receiver 3 receives in the OFF-mode thereof a signal that is composed of a binary code "1111", which is different from the above-described preset code "0101", the controlling unit 32b recognizes the signal as a noise and continues to perform the packet charge.

On the contrary, when the receiver 3 receives in the OFF-mode thereof a signal that is composed of the preset code "0101", the controlling unit 32b recognizes the signal as the informing signal and keeps the operation of the receiver 3 on the OFF-mode until the receiver 3 completely receives the frame.

Figure 4A:
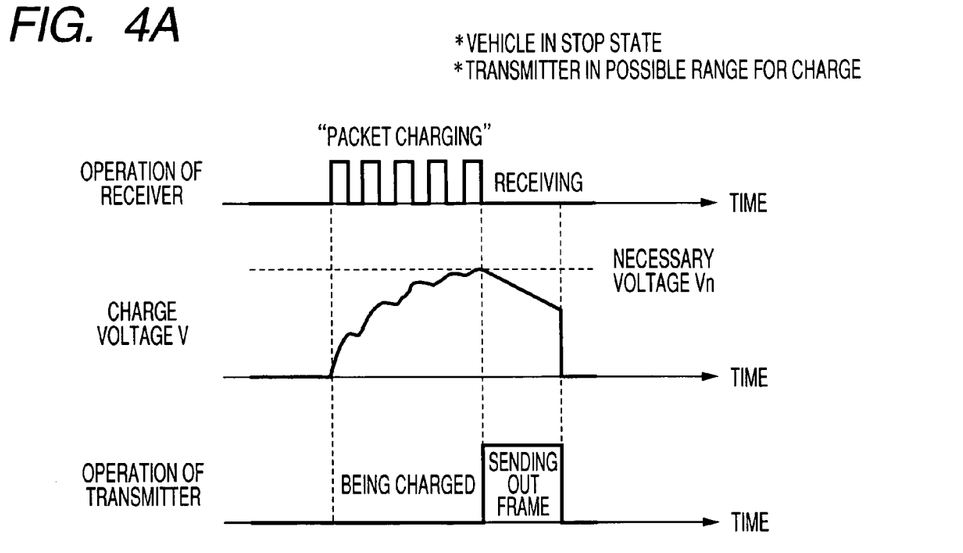
FIG. 4A is a schematic view illustrating the relation between electrical power charge and transmission of signals in the tire inflation pressure sensing apparatus of FIG. 1 when a vehicle, to which the tire inflation pressure sensing apparatus is installed, is in a stop state and the transmitter is positioned in a possible range for charge.
Figure 4B:
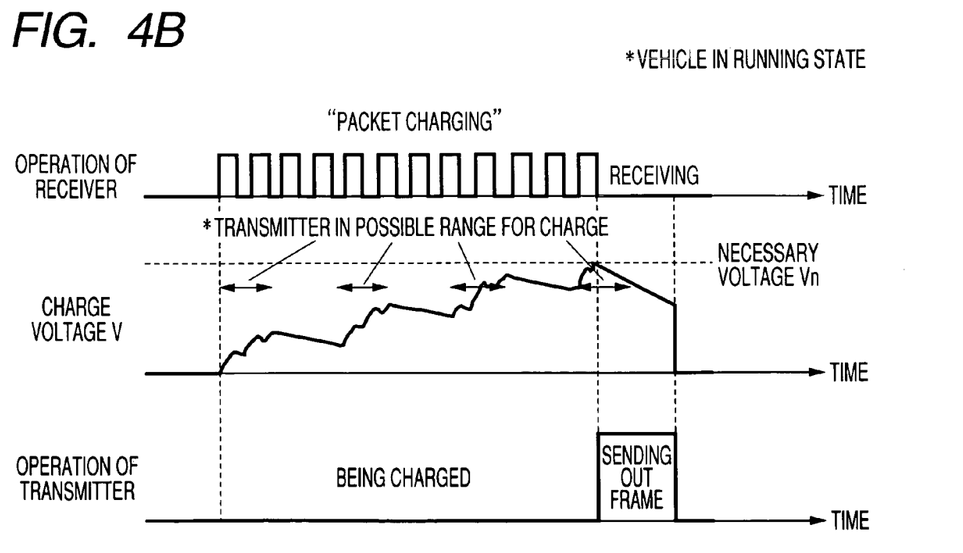
FIG. 4B is a schematic view illustrating the relation between electrical power charge and transmission of signals in the tire inflation pressure sensing apparatus of FIG. 1 when a vehicle, to which the tire inflation pressure sensing apparatus is installed, is running.

The operation of the tire inflation pressure sensing apparatus S1 will be understood more fully from the FIGS. 4A and 4B.

FIG. 4A illustrates the relation between the packet charge and transmission of the frame when the vehicle 1 is in a stop state where the transmitter 2 remains in the possible range for charge.

As shown in FIG. 4A, during the packet charge, the voltage V across the charging unit 22 of the transmitter 2 increases when the receiver 3 operates in the ON-mode and remains constant when the same operates in the OFF-mode.

When the voltage V has gradually increased to the necessary voltage Vn, the transmitter 2 starts to send out the frame, and accordingly, the voltage V begins to decrease.

Once the receiver 3 receives in the OFF mode one of the informing signals contained in the frame, the packet charge is then stopped and the operation of the receiver 3 is kept in the OFF-mode until the receiver 3 completely receives the frame.

FIG. 4B illustrates the relation between the packet charge and transmission of the frame when the vehicle 1 is running.

As shown in FIG. 4B, during the packet charge, the voltage V across the charging unit 22 of the transmitter 2 increases only when the receiver 3 operates in the ON-mode and the transmitter 2 rotates in the possible range for charge. In other words, the voltage V does not increase when the transmitter 2 rotates outside the possible range for charge even if the receiver 3 operates in the ON-mode.

Consequently, when the vehicle 1 is running, the total time required for the voltage V to reach the necessary voltage Vn becomes longer than in the case of FIG. 4A.

The first, second, third, and fourth predetermined time periods T1, T2, T3, and T4, which are essential to the operation of the tire inflation pressure sensing apparatus SI, are determined as follows.

First, a time period Tp required for the receiver 3 to complete one cycle of the packet charge corresponds to the sum (T1+T2) of the first and second predetermined time periods.

When the time period Tp is made equal to a time period Tmin required for the transmitter 2 to complete one revolution together with the wheel, the receiver 3 will repeat the packet charge endlessly if the transmitter 2 rotates outside the possible range for charge during the first predetermined time period T1 for which the receiver 3 sends out the radio wave for electrical power charge.

In such case, the tire inflation pressure sensing apparatus S1 cannot sense the inflation pressure of the tire on the wheel when there is a preset time limit for sensing the tire inflation pressure.

Accordingly, in the present embodiment, the first and second predetermined time periods T1 and T2 are so determined that the time period Tp (i.e., (T1+T2)) is shorter than the time period Tmin.

In addition, the time period Tmin can be determined by the following equation:

$$T\mathrm{min} = (72\pi \times R\mathrm{min})/(1000 \times V\mathrm{max}),$$

where Vmax is the maximum running speed of the vehicle 1, Rmin is the minimum effective rolling radius of the tires on the wheels 5a–5d, and the units for Tmin, Rmin, and Vmax are second, cm, and Km/h, respectively.

Secondly, when the ratio T2/T1 between the second predetermined time period T2 and the first predetermined time period T1 is made large, the total time for bring the voltage V across the charging unit 22 to the necessary voltage Vn will become long, thus making it impossible to realize high-speed sensing of the tire inflation pressure sensing apparatus S1.

Accordingly, it is preferable that the second predetermined time period T2 is made as short as possible, whereas the first predetermined time period T1 is made as long as possible.

However, at the same time, the second predetermined time period T2 is required to be long enough so that the receiver 3 can receive and identify in the OFF-mode thereof at least one of the identical informing signals that are consecutively sent out from the transmitter 2.

For example, when each of the informing signals is composed of the preset code "0101" as described above, the receiver 3 can identify one of the informing signals upon receiving a five bits code "01010" or "10101". Assuming that the bit rate for transmitting the frame from the transmitter 2 to the receiver 3 is equal to 5 kbps, the second predetermined time period T2 is then required to be no shorter than 1 ms.

Accordingly, in the present embodiment, the second predetermined time period T2 is so determined that it is no shorter than a time period T2min that is determined by the following equation:

$$T2\mathrm{min} = (N+1)/A,$$

where, N is the bit number of the preset code that composes the informing signals, and A is the bit rate for transmitting the frame from the transmitter 2 to the receiver 3.

Thirdly, as shown in FIG. 3, the receiver 3 may operate in the ON mode thereof when the transmitter 2 starts to send out the frame after completion of the electrical power charge in the charging unit 22.

In such case, in order to allow the receiver 3 to receive the frame, the transmitter 2 is required to continue sending out the informing signals until the receiver 3 is changed to operate in the OFF-mode thereof and receives completely at least one of the informing signals in the OFF-mode.

Accordingly, in the present embodiment, the third predetermined time period T3 is so determined that it is no shorter than the sum (T1+T2) of the first and second predetermined time periods.

Further, when the third predetermined time period T3 is made long, the total time for sending out the frame (i.e., (T3+T4)) will also become long, thus requiring an increased necessary voltage Vn across the charging unit 22 of the transmitter 2.

Accordingly, it is preferable that the third predetermined time period T3 is made equal to the sum (T1+T2) of the first and second predetermined time periods.

Fourthly, the fourth predetermined time period T4 is determined based on the length of the main signals contained in the frame. For example, when the bit number of the main signals is equal to 80 bits and the bit rate for transmitting the frame from the transmitter 2 to the receiver 3 is equal to 5 kbps, the fourth predetermined time period T4 is then determined equal to 16 ms.

Fifthly, the first predetermined time period T1 is determined based on two different increase rates of charging time for bring the voltage V across the charging unit 22 of the transmitter 2 to the necessary voltage Vn.

The first increase rate Tupr1 of charging time is represented by (T1+T2)/T1, which is a ratio between the charging time required when the packet charge is performed and that required when the receiver 3 continuously sends out in the ON-mode the radio wave for electrical power charge without operating in the OFF-mode.

Figure 5:
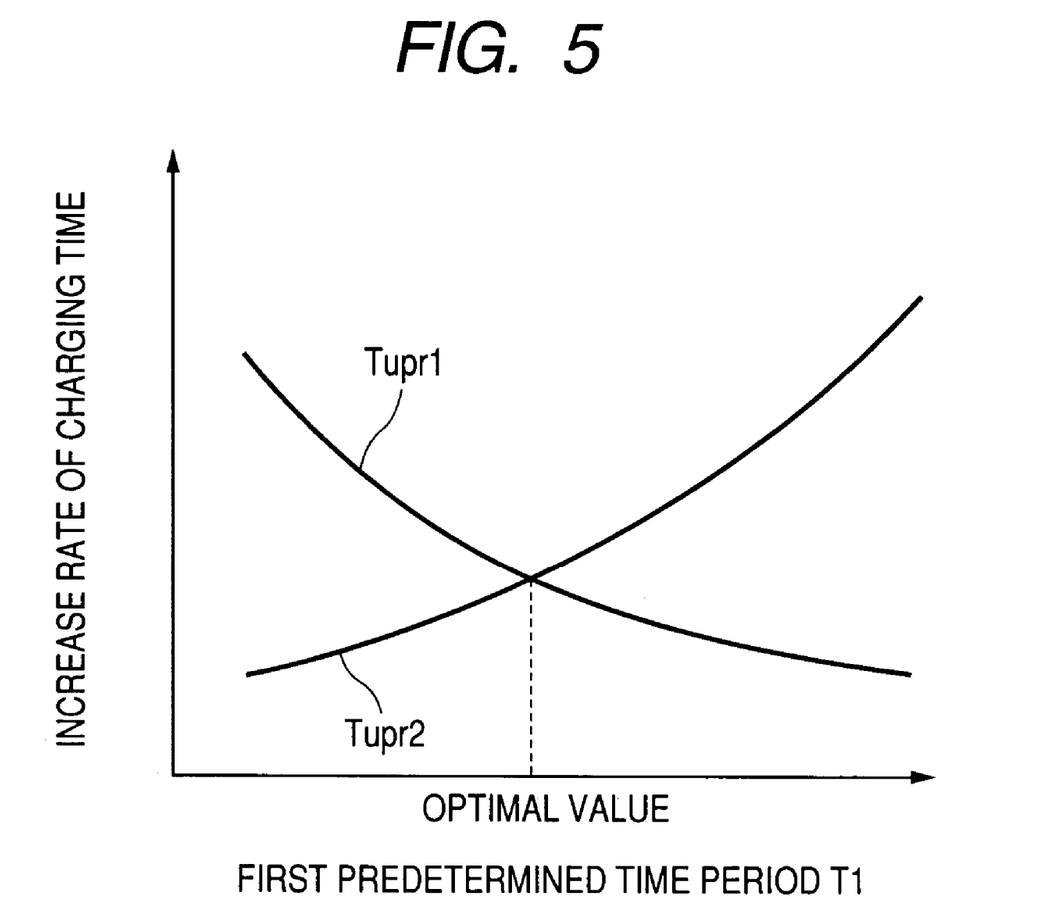
FIG. 5 is a graphical representation illustrating determination of a first predetermined time period T1 for the operation of the tire inflation pressure sensing apparatus of FIG. 1.

The first increase rate Tupr1 of charging time decreases, as shown in FIG. 5, as the first predetermined time period T1 increases. In other words, to decrease the charging time, the first predetermined time period T1 is required to be as long as possible.

The second increase rate Tupr2 of charging time is represented by Q2/Q1, which is a ratio between the electrical charge Q2 required to send out the frame, which contains the plurality of identical informing signals and the main signals, for the time period of (T3+T4) and the electrical charge Q1 required to send out only the main signals for the fourth predetermined time period T4.

As described previously, the third predetermined time period T3 is preferably made equal to (T1+T2). Accordingly, as the first predetermined time period T1 increases, the time period (T3+T4) for which the frame is sent out also increases, thus resulting in an increase in the electrical charge Q2 required to send out the frame.

As a result, the second increase rate Tupr2 of charging time increases, as shown in FIG. 5, as the first predetermined time period T1 increases. In other words, to decrease the charging time, the first predetermined time period T1 is required to be as short as possible.

Considering the above contradiction, in the present embodiment, the horizontal coordinate value of the intersection between the two curves in FIG. 5, which respectively represent the relationship between the first increase rate Tupr1 and the first predetermined time period T1 and that between the second increase rate Tupr2 and the first predetermined time period T1, is determined as the optimal first predetermined time period T1.

In addition to the above-described predetermined time periods T1–T4, it is preferable to preset a maximum time period Tmax for the operation of the tire inflation pressure sensing apparatus S1.

This is because when the receiver 3 failed to receive the informing signal in the OFF-mode thereof due to influence of external noises, it continues to send out the radio wave for electrical power charge even when the voltage V across the charging unit 22 of the transmitter 2 has already increased to the necessary voltage Vn. The radio wave continuously sent out from the receiver 3 may become a noise source for other vehicles that are running close to the vehicle 1.

Accordingly, it is preferable that when the receiver 3 has not received the informing signal from the transmitter 2 over the maximum time period Tmax, the controlling unit 32*b* stops the packet charge once and resumes the packet charge after a certain time period has passed from the stop.

To sum up, the tire inflation pressure sensing apparatus S1 according to the present embodiment includes four transmitters 2, each of which is installed to one of the four wheels 5*a*–5*d* of the vehicle 1, and a receiver 3 installed to the body 6 of the vehicle 1.

Each transmitter 2 includes a sensing unit 21, a charging unit 22, and an antenna 24. The sensing unit 21 works to sense an inflation pressure of a tire mounted on a corresponding one of the wheels and generate a pressure signal representative of the sensed inflation pressure of the tire. The charging unit 22 is configured to be charged with electrical power, which is induced by a radio wave sent from the receiver 3, and supply the electrical power to the receiver 3. Each transmitter 2 works to consecutively send out through the antenna 24 an informing signal and the pressure signal generated by the sensing unit 21. The informing signal is informative of that the pressure signal is to be sent out from the transmitter 2 following the informing signal.

The receiver 3 includes four antennas 31 each of which corresponds to one of the four transmitters 2. The receiver 3 is configured to send out through the antennas 31 the radio wave for electrical power charge, receive through the respective antennas 31 the informing signals and pressure signals sent out from the transmitters 2, and determine the inflation pressures of the four tires based on the respective received pressure signals. The receiver 3 has two operation modes. One mode is an ON-mode in which the receiver 3 sends out the radio wave for electrical power charge without simultaneously receiving the informing signals and pressure signals sent out from the transmitters 2; the other is an OFF-mode in which the receiver 3 stops sending out the radio wave for electrical power charge and is allowed to receive the informing signals and pressure signals sent out from the transmitters 2.

In the above tire inflation pressure sensing apparatus S1, the receiver 3 changes an operation thereof alternately between the ON-mode and OFF-mode so as to keep the operation in the ON-mode for a first predetermined time period T1 and in the OFF-mode for a second predetermined time period T2 until it receives the informing signal from one of the transmitters 2 in the OFF-mode, and then keeps the operation thereof in the OFF-mode until it completes receiving the informing signal and pressure signal from the transmitter 2.

Further, in the above tire inflation pressure sensing apparatus S1, each of the transmitters 2 starts, when a level of the electrical power charged in the charging unit 22 thereof has increased to a predetermined level, to repeatedly send out the informing signal a plurality of times for a third predetermined time period T3, which is no shorter than (T1+T2), and then sends out the pressure signal.

With the above configuration, transmission of the radio wave for electrical power charge from the receiver 3 to the transmitters 2 and that of the pressure signals from the transmitters 2 to the receiver 3 are prevented from being made simultaneously. As a result, the receiver 3 can reliably receive and demodulate the pressure signals from the transmitters 2.

Moreover, with the above configuration, the charging units 22 of the transmitters 2 can be reliably charged with electrical power through the packet charge, without determining the angular positions of the transmitters 2 relative to the receiver 3 and presetting a necessary charging time for the electrical power charge.

Furthermore, with the above configuration, the receiver 3 stops the packet charge only when it receives in the OFF-mode the informing signal from one of the transmitters 2, thereby preventing the packet charge from being stopped by a noise.

While the above particular embodiment of the invention has been shown and described, it will be understood by those who practice the invention and those skilled in the art that various modifications, changes, and improvements may be made to the invention without departing from the spirit of the disclosed concept.

For example, in the previous embodiment of the invention, the receiver 3 has one antenna 31 for each of the transmitters 2, through which the radio wave for electrical power charge is sent from the receiver 3 to the transmitter 2 and the frame is sent from the transmitter 2 to the receiver 3. However, the receiver 3 may have two antennas for each of the transmitters 2, through one of which the radio wave for electrical power charge is sent from the receiver 3 to the transmitter 2 and through the other of which the frame is sent from the transmitter 2 to the receiver 3.

Such modifications, changes, and improvements within the skill of the art are intended to be covered by the appended claims.

What is claimed is:

1. A tire inflation pressure sensing apparatus comprising:
   a pressure sensor provided on a wheel of a vehicle, said pressure sensor working to sense an inflation pressure of a tire mounted on the wheel and generate a pressure signal representative of the sensed inflation pressure of the tire;
   a transmitter provided on the wheel of the vehicle, said transmitter including a first antenna and being configured to consecutively send out through the first antenna an informing signal and the pressure signal generated by said pressure sensor, the informing signal being informative of that the pressure signal is to be sent out from said transmitter following the informing signal;
   a receiver provided on a body of the vehicle, said receiver including a second antenna and being configured to send out through the second antenna a radio wave for providing electrical power for said transmitter, receive through the second antenna the informing signal and pressure signal from said transmitter, and determine the inflation pressure of the tire based on the received pressure signal, said receiver selectively operating in an ON-mode, in which said receiver sends out the radio wave without simultaneously receiving the informing signal and pressure signal from said transmitter, and an OFF-mode in which said receiver stops sending out the radio wave and is allowed to receive the informing signal and pressure signal from said pressure sensor; and
   a charging unit provided on the wheel of the vehicle, said charging unit being configured to be charged with an electrical power, which is induced by the radio wave received by said transmitter through the first antenna, and supply the electrical power to said pressure sensor and said transmitter,
   wherein said receiver changes an operation thereof alternately between the ON-mode and OFF-mode so as to keep the operation in the ON-mode for a first predetermined time period T1 and in the OFF-mode for a second predetermined time period T2 until it receives the informing signal from said transmitter in the OFF-mode, and then keeps the operation thereof in the OFF-mode until it completes receiving the informing signal and pressure signal from said transmitter, and
   wherein said transmitter starts, when a level of the electrical power charged in said charging unit has increased to a predetermined level, to repeatedly send out the informing signal a plurality of times for a third predetermined time period T3, which is no shorter than (T1+T2), and then sends out the pressure signal.

2. The tire inflation pressure sensing apparatus as set forth in claim 1, wherein the second predetermined time period T2 is so determined that it is no shorter than a time required for said receiver to receive once the informing signal from said transmitter.

3. The tire inflation pressure sensing apparatus as set forth in claim 1, wherein the informing signal is composed of a preset code, and wherein when said receiver receives a signal in the OFF-mode, said receiver recognizes the signal as the informing signal when the signal contains the preset code.

4. The tire inflation pressure sensing apparatus as set forth in claim 3, wherein the second predetermined time period T2 is so determined that it is no shorter than a time period T2min that is determined by the following equation:

$$T2\min = (N+1)/A,$$

where, N is a bit number of the preset code, and A is a bit rate for transmitting the preset code from said transmitter to said receiver.

5. The tire inflation pressure sensing apparatus as set forth in claim 1, wherein a voltage across said charging unit represents the level of the electrical power charged in said charging unit, and a necessary voltage across said charging unit, which is required for said transmitter to complete sending out the informing signal and pressure signal, represents the predetermined level of the electrical power.

6. The tire inflation pressure sensing apparatus as set forth in claim 1, wherein when said receiver has not received the informing signal from said transmitter over a predetermined time period Tmax, said receiver stops changing the operation thereof alternately between the ON-mode and OFF-mode.

7. The tire inflation pressure sensing apparatus as set forth in claim 1, wherein the first and second predetermined time periods T1 and T2 are so determined that (T1+T2) is shorter than a time period Tmin required for the wheel to complete one revolution.

8. The tire inflation pressure sensing apparatus as set forth in claim 1, wherein the first predetermined time period T1 is determined based on a first increase rate Tupr1 of charging time for said charging unit, which is represented by (T1+T2)/T1, and a second increase rate Tupr2 of charging time for said charging unit which is represented by Q2/Q1, where Q2 is an electrical charge required for sending out the informing signal the plurality of times and the pressure signal once, and Q1 is an electrical charge required for sending out only the pressure signal once.

9. The tire inflation pressure sensing apparatus as set forth in claim 8, wherein the first predetermined time period T1 is determined in the following way:
   defining a two-dimensional coordinate plane, where a horizontal coordinate axis indicates the first predetermined time period T1, while a vertical coordinate axis indicates an increase rate of charging time for said charging unit;
   drawing a first curve on the plane which represents a relationship between the first increase rate Tupr1 and the first predetermined time period T1;
   drawing a second curve on the plane which represents a relationship between the second increase rate Tupr2 and the first predetermined time period T1; and
   determining a horizontal coordinate value of an intersection between the first and second curves as the first predetermined time period T1.

* * * * *